(12) United States Patent
Tanaka

(10) Patent No.: US 6,819,919 B1
(45) Date of Patent: Nov. 16, 2004

(54) METHOD FOR PROVIDING MATCHING AND INTRODUCTION SERVICES TO PROXIMATE MOBILE USERS AND SERVICE PROVIDERS

(75) Inventor: Hirohisa A. Tanaka, Menlo Park, CA (US)

(73) Assignee: Telcontar, San Jose, CA (US)

( * ) Notice: Subject to any disclaimer, the term of this patent is extended or adjusted under 35 U.S.C. 154(b) by 425 days.

(21) Appl. No.: 09/691,322

(22) Filed: Oct. 18, 2000

Related U.S. Application Data
(60) Provisional application No. 60/162,333, filed on Oct. 29, 1999.

(51) Int. Cl.[7] .............................. H04Q 7/20; H04Q 7/38
(52) U.S. Cl. .............................. 455/414.1; 455/414.2; 455/456.1; 455/456.3; 455/412.1; 455/456.5; 455/422.1; 342/357.7; 342/357.6; 342/357.8
(58) Field of Search ........................... 455/456.1, 456.2, 455/456.3, 456.6, 457, 404.1, 404.2, 414.1, 412.1, 403, 427, 435.1, 422.1, 550.1, 552.1, 426.1, 426.2, 414.2, 414.3, 414.4, 433, 517; 342/357.12, 357.06, 357.08, 357.1

(56) References Cited

U.S. PATENT DOCUMENTS

| | | | |
|---|---|---|---|
| 5,043,736 | A | 8/1991 | Darnell et al. |
| 5,295,180 | A | 3/1994 | Vendetti et al. |
| 5,568,153 | A | 10/1996 | Béliveau |
| 5,758,288 | A | 5/1998 | Dunn et al. |
| 5,761,648 | A | 6/1998 | Golden et al. |
| 5,774,802 | A | 6/1998 | Tell et al. |
| 5,852,775 | A | 12/1998 | Hidary |

(List continued on next page.)

FOREIGN PATENT DOCUMENTS

| | | |
|---|---|---|
| EP | 0 708 571 A2 | 4/1996 |
| WO | WO 97/13387 A1 | 4/1997 |
| WO | WO 97/41654 A1 | 11/1997 |
| WO | WO 98/36585 A2 | 8/1998 |
| WO | WO 99/05597 A1 | 2/1999 |
| WO | WO 99/33199 A1 | 7/1999 |
| WO | WO 99/56144 A1 | 11/1999 |
| WO | WO 99/66757 A1 | 12/1999 |
| WO | WO 00/04730 A1 | 1/2000 |
| WO | WO 00/22860 A1 | 4/2000 |
| WO | WO 00/35216 A1 | 6/2000 |
| WO | WO 00/40038 A2 | 7/2000 |
| WO | WO 00/51333 A1 | 8/2000 |
| WO | WO 00/62564 A1 | 10/2000 |
| WO | WO 01/24551 A1 | 4/2001 |

OTHER PUBLICATIONS www.signalsoftcorp.com (printed web pages).
www.sigma–1.com (printed web pages).
www.iprox.com (printed web pages).
Hadfield, Peter. "You can run, but you can't hide," Aug. 21, 1999, *New Scientist*, 1 page.

(List continued on next page.)

*Primary Examiner*—William Trost
*Assistant Examiner*—Keith Ferguson
(74) *Attorney, Agent, or Firm*—Fenwick & West LLP

(57) ABSTRACT

A system enabling mobile wireless users to obtain information on other proximate users both fixed and wireless. Said information is gathered from a central database that stores user profiles and real-time locations of system users. Mobile users can request information on nearby users by submitting a request from a mobile telephone or similar communications endpoint to the central database. The request is accompanied by the user's location, obtained from GPS (Global Positioning System) or other technology, or from user input. The server searches the profile database for nearby users based on requester's location, locations of other users of the system and optional parameters specified in the request. Search results are returned to the requester. The system facilitates communication between requester and owner(s) of profiles returned by system.

31 Claims, 4 Drawing Sheets

U.S. PATENT DOCUMENTS

| | | | |
|---|---|---|---|
| 5,873,040 A | 2/1999 | Dunn et al. | |
| 5,884,272 A | 3/1999 | Walker et al. | |
| 5,918,180 A | 6/1999 | Dimino | |
| 5,953,400 A | 9/1999 | Rosenthal et al. | |
| 5,963,864 A | 10/1999 | O'Neil et al. | |
| 5,966,696 A | 10/1999 | Giraud | |
| 5,974,393 A | 10/1999 | McCullough et al. | |
| 5,982,281 A | 11/1999 | Layson, Jr. | |
| 5,995,015 A | 11/1999 | DeTemple et al. | |
| 6,018,699 A | 1/2000 | Baron, Sr. et al. | |
| 6,044,261 A | 3/2000 | Kazmi | |
| 6,047,327 A | 4/2000 | Tso et al. | |
| 6,052,122 A | 4/2000 | Sutcliffe et al. | |
| 6,055,434 A | 4/2000 | Seraj | |
| 6,060,995 A | 5/2000 | Wicks et al. | |
| 6,061,561 A | 5/2000 | Alanara et al. | |
| 6,061,681 A | 5/2000 | Collins | |
| 6,067,045 A | 5/2000 | Castelloe et al. | |
| 6,067,356 A | 5/2000 | Lautenschlager et al. | |
| 6,073,138 A | 6/2000 | de l'Etraz et al. | |
| 6,091,956 A | 7/2000 | Hollenberg | |
| 6,119,014 A | 9/2000 | Alperovich et al. | |
| 6,157,841 A | 12/2000 | Bolduc et al. | |
| 6,166,685 A | 12/2000 | Soliman | |
| 6,181,927 B1 | 1/2001 | Welling, Jr. et al. | |
| 6,208,866 B1 | 3/2001 | Rouhollahzadeh et al. | |
| 6,233,506 B1 * | 5/2001 | Obradovich et al. | 455/404.1 |
| 6,286,005 B1 | 9/2001 | Cannon | |
| 6,292,672 B1 | 9/2001 | Chavez, Jr. | |
| 6,292,743 B1 * | 9/2001 | Pu et al. | 455/456.1 |
| 6,332,127 B1 | 12/2001 | Bandera et al. | |
| 6,360,102 B1 | 3/2002 | Havinis et al. | |
| 6,377,793 B1 | 4/2002 | Jenkins | |
| 6,381,465 B1 | 4/2002 | Chern et al. | |
| 6,397,057 B1 | 5/2002 | Malackowski et al. | |
| 6,400,956 B1 | 6/2002 | Richton | |
| 6,411,891 B1 | 6/2002 | Jones | |
| 6,442,391 B1 | 8/2002 | Johansson et al. | |
| 6,484,148 B1 | 11/2002 | Boyd | |
| 6,505,046 B1 | 1/2003 | Baker | |
| 6,549,768 B1 * | 4/2003 | Fraccaroli | 455/456.1 |
| 2001/0027111 A1 | 10/2001 | Motegi et al. | |

OTHER PUBLICATIONS

Krishna et al., "Static and Adaptive Location Management in Mobile Wireless Networks," Computer Communications, Elsevier Science Publishers BV, vol. 19, No. 4, Apr. 1, 1996, pp. 321–334.

Nelson, "User Interaction with Machines on the Move: Location Aware Computing," Computers in Industry, Elsevier Science Publishers BV, vol. 29, No. 1, Jul. 1, 1996, pp. 63–70.

* cited by examiner

METHOD FOR PROVIDING MATCHING AND INTRODUCTION SERVICES TO PROXIMATE MOBILE USERS AND SERVICE PROVIDERS

CROSS-REFERENCE TO RELATED APPLICATION

This application claims the benefit of the filing date of the previously filed U.S. Provisional Application Ser. No. 60/162,333 filed Oct. 29, 1999, as provided under 35USC 119(e).

TECHNICAL FIELD

The present invention relates in general to a personal matching/meeting service that utilizes wireless, and/or Internet infrastructures coupled with real-time positional data. Said infrastructures are used to connect users to a database of user profiles and real-time positional data. Said database is used to inform system users when they come within range of other users who meet search criteria. In particular, the present invention relates to improving personal meeting/matching services by locating users using positioning technology embedded within the wireless communications unit, peripherally attached, manually entered or obtained from the mobile communications infrastructure.

BACKGROUND ART

Several Internet based technologies have sought to introduce people and facilitate forms of dialogue. One such technology is the "chat room". In its traditional form, a chat room allows users to type messages via a keyboard and to view in real-time the messages that are typed by themselves and other users. Another technology known as a "news group" allows users to post messages, data, and post replies to posted messages. In both of these technologies, the users in a given chat room or on given news groups are physically separated, often by thousands of miles. Neither the chat room nor the news group allows the user to gather information about people around him, or to search for people around him.

Another more traditional system for introducing people is the dating or personal matching service. The object of such a system is ultimately to arrange a face-to-face meeting. In traditional systems, users submit a profile to the system containing information about them and about whom they would like to meet. The problem with traditional personal matching systems is that they do not maintain the user's real-time positions. This means that the system will probably only provide matches to users who live near each other. A dating service that matched a person in New York with a person in Moscow would be useless to most users despite the fact that the person in Moscow might well provide the best compatibility with the person in New York. The problem is that the parties are too physically distant for a meeting to be practical. However, if the New Yorker ever found himself in Moscow, a meeting would be feasible, but the traditional matching system would be unaware that the users had come within reasonable range of each other, because traditional systems do not maintain the real-time positions of the users. Thus the traditional system would not arrange for the parties to meet. A more detailed description of the need for the invention disclosed herein is found in U.S. Provisional application Ser. No. 60/162,333 filed Oct. 29, 1999 and is hereby incorporated by reference.

DISCLOSURE OF THE INVENTION

Figure 1:
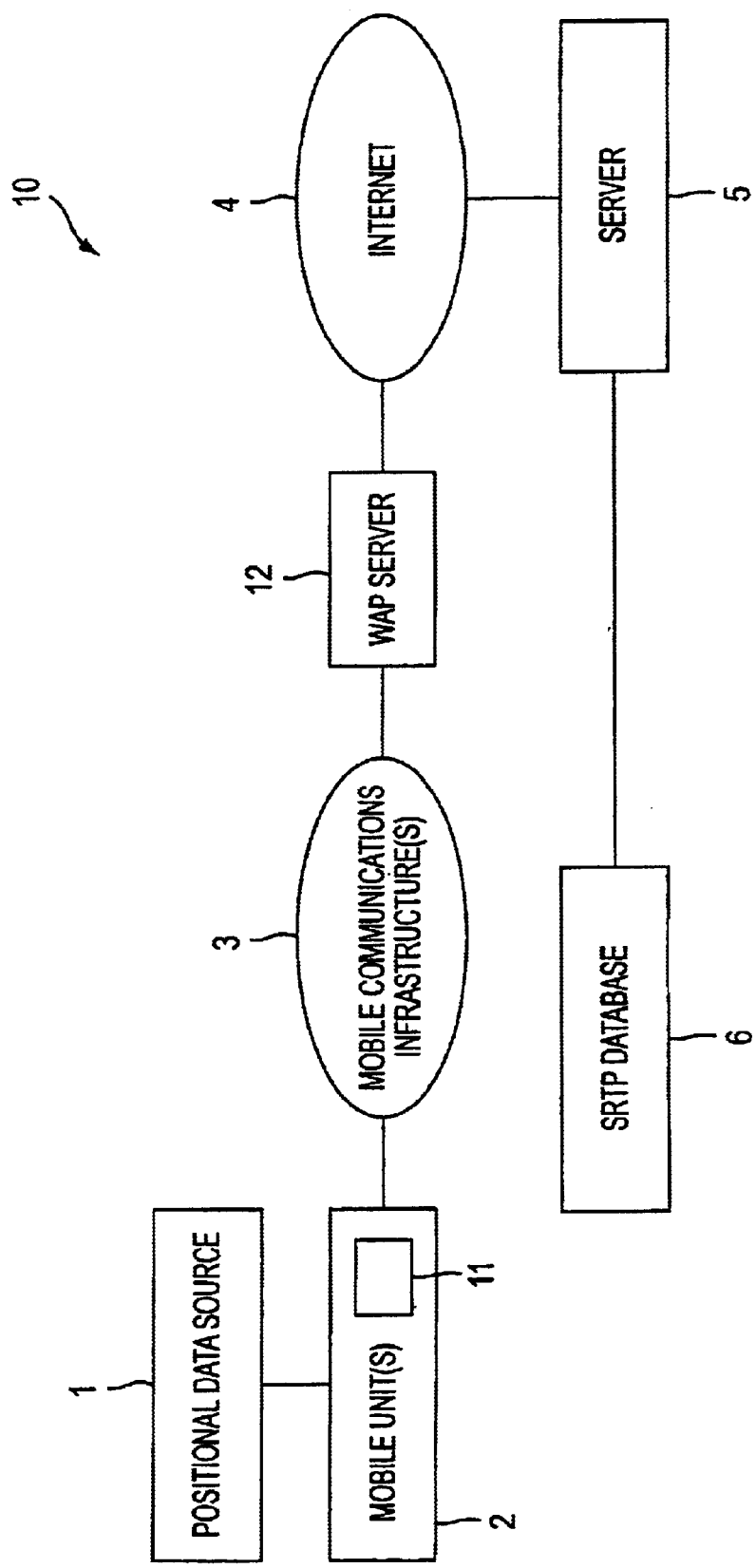
FIG. 1 is a system level schematic.

An object of the invention is to provide matching and/or introduction services between mobile users, and other mobile users or non-mobile users, in response to real-time, proximate positioning and correlated user profiles.

Users establish profiles in a central secure real-time positional. (SRTP) database via WWW technology. Said profiles contain personal information the user chooses to reveal. Individuals or service providers, such as a restaurant or a taxi service (mobile or fixed locations) can establish profiles. This information may include hobbies, interests, gender information, age, etc. Profiles are based on a standard format, but users have the option of customizing content. Users choose which portions of their profile to make accessible, when, and to whom, via a user customizable "PublicImage" which follows permissions similar to UNIX-based file permissions. Users define Access-groups and assign Access-control permissions to those groups for various sections of the PublicImage similar to the UNIX operating system method for access control for file and directory structure read/write privileges. The system contains a security flag, which can be set by the user to prevent his PublicImage from being viewed by other users of the system. For example, a user might create a group called "Friends" and a group called "Business Associates." The Friends group might be given read permissions to the user's hobbies list, while the Business Associates group would not. The Business Associates group might be given read permissions to schedule and resume information, whereas friends may not be given access to this data. Users may update or alter their profiles with their mobile unit (MU) or other communications terminal, fixed or mobile. Each user, is assigned a user_ID which is a string of characters used to uniquely identify the owner of the PublicImage. The user_ID is conceptually similar to the UNIX user/login name.

Essential to the functionality of the system is the real-time position of the users, and the exact date and time the position is logged. The user's position and "registration time" is stored in the. SRTP database with the user profiles. The registration time could be obtained from an operating system call made by the server to determine the exact date and time the server receives the user's position, or the user's message (with position information) could be date and time "stamped" by the MU immediately prior to transmission.

Mobile users move about with mobile communication units in their possession. Said mobile units are capable of establishing data connections via a wireless link, through a wireless infrastructure, to the Internet, and ultimately to a server that communicates with the SRTP database. Said mobile units contain a means for determining and relaying the geographic position of the mobile unit to the server. Said means for determining the position of a MU might be an integrated GPS receiver, cellular triangulation such as Time Difference of Arrival (TDOA), LORAN system, or even a more coarse position determination technique such as using the closest broadcasting base-station based on Received Signal Strength Indication (RSSI) or other means. Ideally, the position sensor would be a GPS receiver embedded in (or attached peripherally) to the mobile unit (or users mobile laptop computer), but the positional sensor (or data source) could also be the user himself. In this case, the user could manually enter his position into the mobile unit, either by typing on a keypad or keyboard, or by using a stylus and tapping a map or location in a table. The most likely format for user entered data would be street address or other physical landmark (e.g. Fenway Park in Boston Mass.). An element of this invention is the mechanics of tapping (or otherwise contacting) on a map (or table/spreadsheet entry, computer icon etc.) displayed on a computer screen resulting in the automatic relaying of the users current geographic position to the SRTP database. This is similar to the "click and buy" feature currently employed on the Internet for purchasing a product or service where a computer mouse is used to "click" on a computer icon. The system is not restricted to a single position data format (e.g. latitude and longitude used for GPS or LORAN coordinates). The server (or other system component) would simply identify the format and translate it into a data format used within the database.

A server is typically used to provide access to the SRTP database. One implementation of the server is an HTTP server. The purpose of the HTTP server is to facilitate an HTTP transport layer connection with the mobile unit or intermediate point. Said connection allows the user to update his portion of the database. In a typical implementation, the HTTP server would generate WWW pages that would be viewed from any WWW browser. Said WWW pages contain forms that would allow the user to be authenticated by the HTTP server, edit his PublicImage, edit his Access Control, edit his Access groups, submit search requests, etc. Said HTTP server is also used to return results of database queries to the user in browsable form.

Once users have registered their profiles with the system, they can use their MU to update their position and submit queries of the database and be notified of queries made by other users. Mobile user records exist in the database in one of the following states:

Locked: Users in locked mode will not be included in searches from other users. Users can set themselves in locked mode for privacy or security reasons. If the user's position has not been updated after a predetermined time set by the user, the position is considered invalid, i.e. timed out. Unless the user takes steps to update the position data, he or she will not be included in any query_results from other users. Non-mobile users, such as fixed-point service providers can set time-out to infinity, meaning that their position will not change. An optional operational feature may be the users position can be updated autonomously simply by the user setting an auto_position flag. When the auto_position flag is set, the MU transmits the user's geographic position to the server every time the MU unit registers with the local wireless cell/PCS site in the same way a cellular phone performs auto registration, already well known in the art of wireless communications.

Standby: The user goes from disconnected to standby by registering his current location to the server. In standby mode, user profiles become accessible to server queries and time-out counters are set.

Browsing mode: In browsing mode, the user submits a request to the server. The request contains search parameters the database server uses to find matching profiles, as well as the position of the requester. By obtaining the location of the requester, the database can return profiles for users that are physically close to the requester. "Near" is a user defined search radius accompanying the request or as part of the user profile. In addition to position, search parameters and search radius, the user can specify temporal parameters for the search(s) to occur. One temporal parameter, periodicity, allows a user to tell the server how often to perform the defined search, for example every 30 minutes. The user can also specify the persistence of the search. The persistence determines the number of searches that are to be carried out. The user can define the persistence as a number of searches, or as a maximum time interval to continue searches. For example, perform 24 searches, or search for the next 12 hours. Combining periodicity and persistence in the example supra yields "search every half hour for the next 12 hours."

Once a user has submitted a request, he or she receives a reply from the server containing accessible portions of PublicImages of other users matching the requesters query. The user reviews the search results via the MU and interacts with the search results much in the same way WWW users interact with results from search engines. The user views the PublicImages and decides whether or not to request to contact the owner of a specific PublicImage. The request to contact the owner of a Public Image is initiated by sending the requester's (Person A) PublicImage to the desired recipient(Person B). If Person B is not a member of any access control group previously defined by Person A, Person B accesses Person A's PublicImage with "Public" access permissions, containing the most limited information from Person A's Public Image. Included in this request for contact is a list of preferred means of contacting Person A. Person B can choose to accept or reject the request for contact from Person A. If Person B chooses to accept the request, Person B must choose a method of responding. The system supports secure contact, in which no personal contact information is disclosed. For example, an email message can be sent through the server without revealing either person's private email address or location. Contact can also be initiated through Caller-ID blocked phone calls or any other means. Consequently, Person A and Person B can choose to initiate face-to-face contact.

Figure 3:
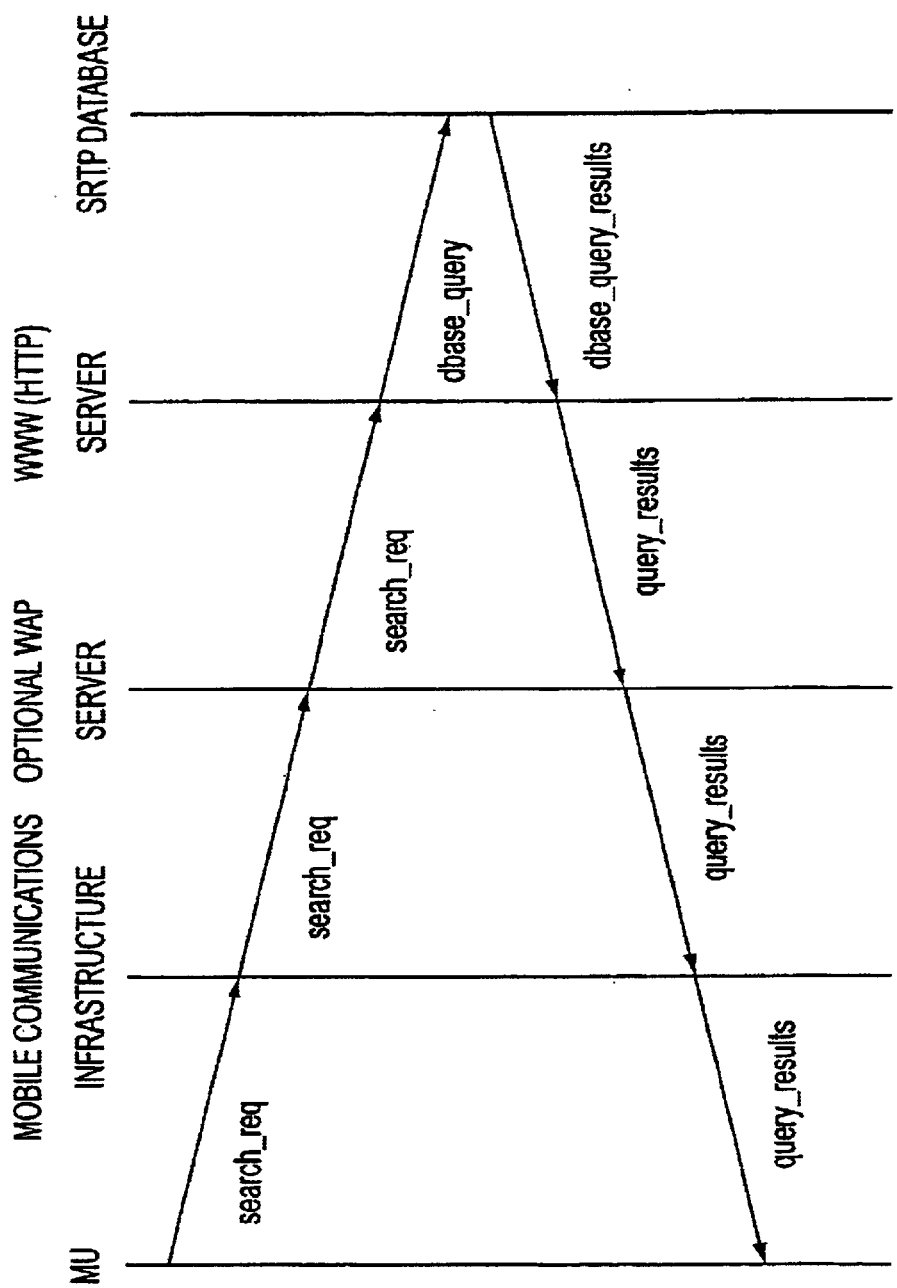
FIG. 3 illustrates a typical message timeline of the system of FIG. 1.

FIG. 3 describes an embodiment of message traffic between a mobile terminal and the SRTP database. The nature of the transport layer connections is not shown on the diagram, but are well known in the art. In one embodiment the MU would be connected to the WAP (Wireless Application Protocol) server via a WAP connection and the WAP server would be connected to the HTTP (WWW) server via an HTTP connection.

The purpose of the user initiated search request, search_req, is to allow the user of a mobile unit to query the WWW server to perform a database search. Search criteria are contained within the message body. For example, the message might instruct the web server to search the SRTP database for profiles including the word "baseball". It could further instruct the web server to return profiles only for users within a given geometric radius, for example 2 miles from the user. The search_req of this embodiment has 5 fields: requestor_ID, password, user position, search_words, and search_radius. These fields could either be encoded or sent as cleartext. The following search_req fragment assumes the search_req is sent as cleartext. In this embodiment the keywords and values are sent as colon separated pairs.

search_req="requestor_ID:John23:password:xdw94f4:position:GPS 234.33 153.65:search_words:baseball:search_radius:1 mile"

The search_req becomes a dbase_query after being forwarded to the Secure Real Time Database by the server (e.g. WWW server). Said query is formulated based on the position, Search_radius and search_words fields in the search_req.

The requestor_ID (or user_ID) field in the search_req divulges to the WWW server the identity of the registered system user who is making the request. The password is used for security to insure that the request in fact originated from the user who originally registered with the WWW server.

The position field in the search_req is used to convey the requesting users geographic position to the web server. The value following the position field (also referred to as a key) includes information that identifies what type of positional data is being presented. If the mobile unit has an integrated (or peripherally attached) GPS unit, the mobile unit would send GPS coordinates as the standard latitude and longitude. Other formats are also supported. For example, users without GPS receivers might need to enter the position manually as a street address. In this case the position key:value pair might appear as "position:STREET 345 main St., anytown, anystate, USA". Furthermore, if this data were provided by the cellular infrastructure itself through triangulation of radio signals using Time Difference of Arrival (TDOA) or some other location technique, the position field would originate within the mobile communications infrastructure.

Some key:value pairs are optional. For example, if no search words were sent, the WWW server would have default search capability that uses search words from the requester's user profile as search_words. The search_radius could also be omitted and the WWW server would perform the database search using a default radius (e.g. one mile). The password might also be omitted if some information such as the MU's Mobile Identification Number and/or Electronic Serial Number could be automatically obtained from the phone or mobile communications infrastructure to verify the identity of the requesting MU.

The Secure Real Time Position database (SRTP) yields raw, unformatted data, database_query_results, that are the results of the database query and are returned to the server. The WWW server reformats the dbase_query_results and returns the data to the user in a browsable form as query_results.

DETAILED DESCRIPTION OF THE PREFERRED EMBODIMENT

Figure 2:
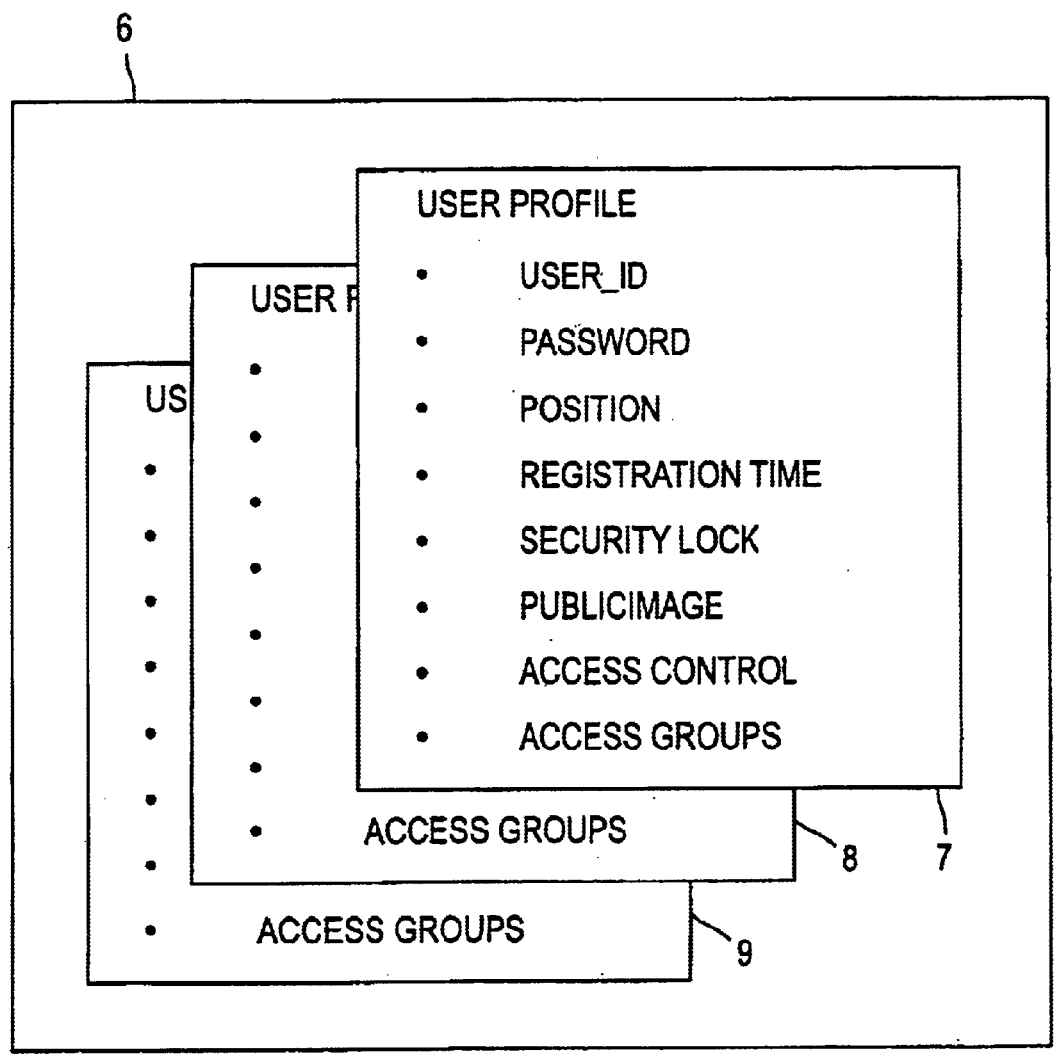
FIG. 2 illustrates one embodiment of a plurality of user profiles stored within the Secure Real-Time Positional database of FIG. 1.

With reference to FIG. 1 of the drawings, a system 10 for providing a method of matching and introduction services generally includes position determining means 1, a communications device 2, which may be fixed or mobile, a wireless communications infrastructure 3, an Internet connection 4 that may be wired or wireless, a server 5 provides access to Secure Real Time Positional (SRTP) database 6. Referring to FIG. 2, the SRTP database 6 includes a plurality of user profiles 7, 8, and 9.

With reference to both FIGS. 1 and 2, a first user creates a user_profile 7 using a communications device 2 which is preferably a wireless mobile phone, wireless Personnel Digital Assistant (PDA), beeper, or additionally a fixed terminal, wired or wireless, and stores said user_profile 7 in the Secure Real Time Positional database 6. Said user_profile 7 comprises a user_ID, user password, said first users current geographic position, the time and/or date said first users current position was last updated, a security lock to prevent viewing of said user_profile 7 by other users, access control features to assign read/write privileges to other users or groups of users, and a PublicImage portion of said user_profile 7 which said first user customizes with any desirable content such as hobbies, dating preferences, music preferences, or even graphics, audio, video, or text.

Said SRTP database 6 contains a plurality of previously registered additional user_profiles 8, 9 each also comprising a user_ID, user password, users current position, the time and/or date a users current position was last updated, a security lock, access control features, and a PublicImage portion of said user_profiles 8,9.

Said first user submits a search_request to the system 10 using communications device 2 together with search criterion including keywords and geographic search radius. Said first user's geographic position is automatically determined by position sensor 1 and is embedded in the search_request submitted to the system 10. Position sensor 1 is preferably an embedded Global Positioning System (GPS) receiver or "chipset" integrated into the communications device. An alternate embodiment is a display 11 in the communications device 2 that presents said first user with information such as a map so said first user may simply tap the display 11 in the communications device 2 with a stylus or other pencil-like instrument at the location where said first user currently resides. The communications device 2 recognizes the precise geographic location of the user by where on the display 11 said first user taps and automatically includes this location in the search_request submitted to the system 10. The techniques whereas a computer can correlate a tap on a display with data in the computers memory is already well known in the art such as is used in the Hewlett Packard 360LX palmtop PC. The novelty in the invention disclosed herein is that the tap on the display 11 is interpreted as a geographic position by the communications device 2 and is automatically relayed to a distant location, in this embodiment, the server 5. The information presented on display 11 can be a map, table of landmarks, list of streets, or even an address corresponding to a phone number such as the E911 services employ.

Said first users search_request is transmitted by the communications device 2 to the wireless communications infrastructure 3 where a connection is made to the Internet 4. The connection to the Internet 4 may alternately be made through an optional intermediate Wireless Application Protocol server 12 to facilitate communications as shown in FIG. 1. Said first user's search_request arrives at the World Wide Web (WWW) server 5 from the Internet 4.

Figure 4:
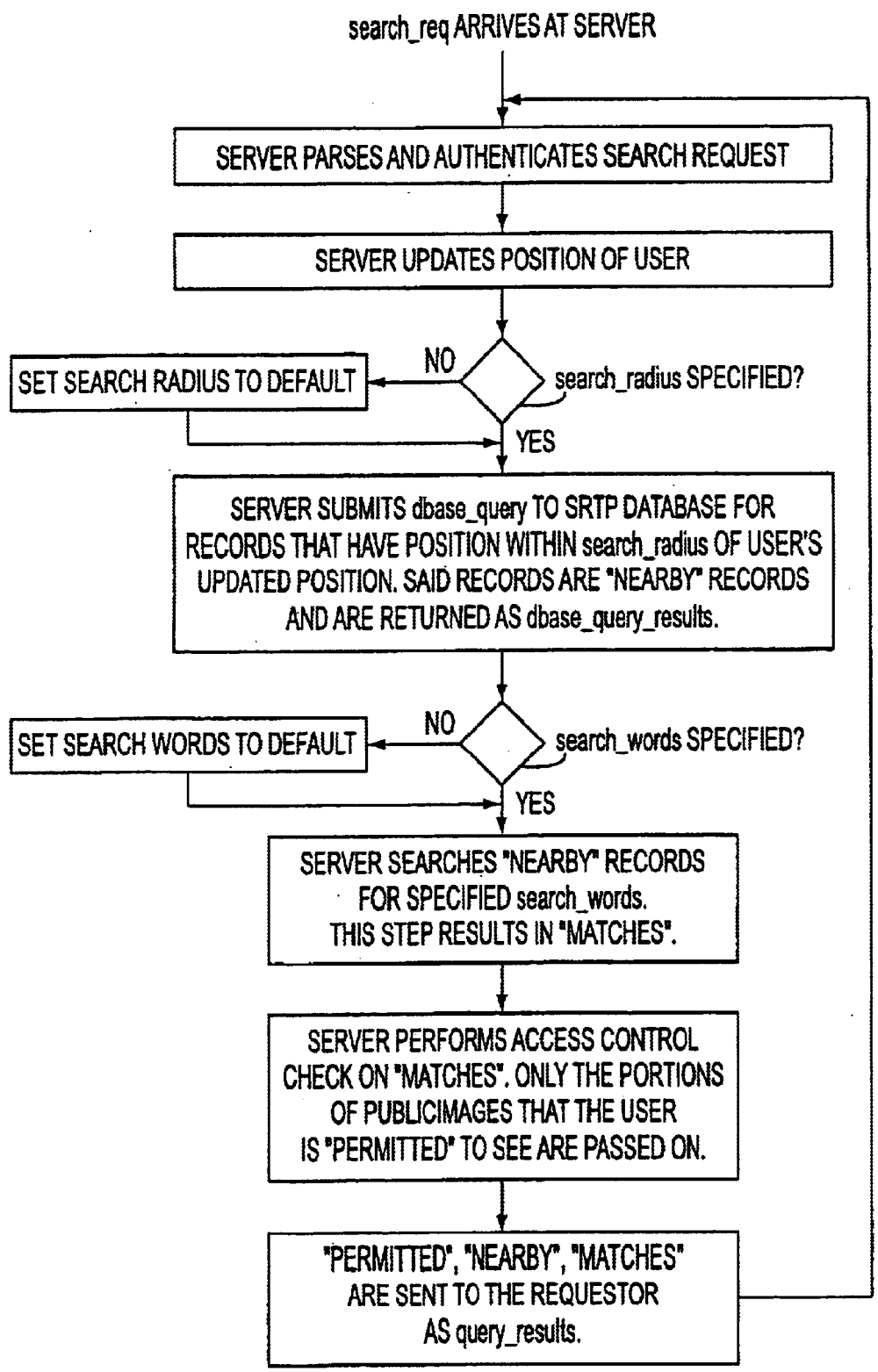
FIG. 4 is a flowchart embodiment of the present invention for searching the Secure Real-Time Positional database of FIG. 1.

Referring to FIG. 4, said first users search_request is authenticated and parsed for the required information and syntax by server 5. The server 5 then updates said first users geographic position in the SRTP database 6. The server 5 begins the search process for a match or matches to said first users search_request by first querying the SRTP database 6 for other users that are geographically proximate to said first user within the search radius specified in said first users search_request or said first users user_profile if a search radius is not included in said first users search_request. Other user_profiles 8,9 returned from the SRTP database 6 are then searched by the server 5 for search_words specified in said first users search_request or said first users user_profile if search_words are not included in said first users search_request. The user_profiles 8,9 that are both geographically close to said first user and contain some of the search_words specified by said first user, are examined for access control restrictions specified in said user_profiles 8,9. The PublicImages of the user_profiles 8,9 that do not have any access control features enabled are relayed to said first user as query_results. Said first user examines query_results returned by system 10 for user_profiles that are of interest. Said first user chooses a user_profile 9 belonging to a second user. The system 10 responds to said first users selection of user_profile 9 by notifying said second user that said first user wishes to make contact in the manner specified by said first users user_profile 7.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A method for providing matching and introduction services to users of communications equipment comprising the steps of:
   storing at least two user profiles in a database;
   storing the real-time geographic position of a plurality of users in said database;
   a first user submits a first search request to a first server using a first wireless communications device;
   said server performs a first search of said database by:
      initially sorting said user profiles based on geographic proximity to said first user;
      further sorting the remaining said user profiles that contain at least one search word specified by said first user; and
      selecting remaining user profiles that contain access control features that have been disabled;
      said server returns search results to said first user; and facilitating communication between said first user and other users whose user
      profiles have been selected by said first user.

2. The method according to claim 1 wherein said user profiles are created and stored using said wireless communications device.

3. The method of claim 1 or 2 wherein said user profiles are created and stored in said database via a World Wide Web connection.

4. The method of claim 1 wherein said first user's current geographic position is determined by GPS technology integral to said wireless communications device.

5. The method of claim 1 wherein said first user's current geographic position is determined by triangulation of radio waves emitted by said wireless communication device.

6. The method of claim 1 wherein said first user's current geographic position is determined by Received Signal Strength Indication of the transmitted signal from said wireless communications device by at least one receiving station remote from said communications device.

7. The method of claim 1 wherein said first user's current geographic position is determined by said first user entering said position data via manual interface with said wireless communications device.

8. The method of claim 1 wherein said wireless communication device automatically determines and then transmits said first user's current geographic position as part of said search request.

9. The method of claim 1 wherein said search is performed a plurality of times in response to said user defining the periodicity and persistence of said search of said database.

10. The method of claim 1 wherein said first user is automatically notified if an additional user becomes proximate to said first user wherein said additional user meets criterion established in said search of said database.

11. A method for providing matching and introduction services to mobile users of wireless communications equipment comprising the steps of:
   creating and storing at least two user profiles in a database;
   storing the real-time geographic position of a plurality of uses in said database;
   a first user submits a first search request to a first server using a first mobile wireless communications device;
   said first users current geographic position is transmitted to said database with said search request;
   a first search of said database is performed by said server using parameters provided by said first user and includes:
      updating said database with said first user's current geographic position;
      initially sorting said user profiles based on geographic proximity to said first user;
      further sorting the remaining said user profiles that contain at least one search word specified by said first user;
      selecting any remaining user profiles that contain access control features that have been disabled;
   said server returns search results to said first user; and
   facilitating communication between said first user and other users whose user profiles have been selected by said first user.

12. The method according to claim 11 wherein said use profiles are created and stored using said wireless communications device.

13. The method of claim 11 or 12 wherein said user profiles are created and stored in said database via a World Wide Web connection.

14. The method of claim 11 wherein said first user's current geographic position is determined by GPS technology integral to said wireless communications device.

15. The method of claim 11 wherein said first user's current geographic position is determined by triangulation of radio waves emitted by said wireless communication device.

16. The method of claim 11 wherein said first user's current geographic position is determined by Received Signal Strength Indication of the transmitted signal from said wireless communications device by at least one receiving station remote from said communications device.

17. The method of claim 11 wherein said first user's current geographic position is determined by said first user entering said position data via manual interface with said wireless communications device.

18. The method of claim 11 wherein said wireless communication device automatically determines and then transmits said first user's current geographic position as part of said search request.

19. The method of claim 11 wherein said search is performed a plurality of times in response to said user defining the periodicity and persistence of said search of said database.

20. The method of claim 11 wherein said first user is automatically notified if an additional user becomes proximate to said first user wherein said additional user meets criterion established in said search of said database.

21. The method of claim 11 wherein said search of said database further includes the steps of syntax parsing and authenticating said first user's search request.

22. A computer program product for providing matching and introduction services to users of communications equipment, the computer program product including a computer-readable medium having computer program code for performing the operations of:

storing at least two user profiles in a database;

storing real-time geographic positions of a plurality of users in the database;

receiving from a first user a first search request, the request transmitted using a first wireless communications device;

performing a first search of the database by:
  initially sorting the user profiles based on geographic proximity to the first user;
  further sorting the remaining user profiles that contain at least one search word specified by the first user; and
  selecting remaining user profiles that contain access control features that have been disabled;

returning search results to the first user; and facilitating communication between the first user and other users whose user profiles have been selected by the first user.

23. The computer program product of claim 22 wherein the user profiles are created and stored using the wireless communications device.

24. The computer program product of claim 22 wherein the user profiles are created and stored in the database via a World Wide Web connection.

25. The computer program product of claim 22 wherein the first user's current geographic position is determined by GPS technology integral to said wireless communications device.

26. The computer program product of claim 22 wherein the first user's current geographic position is determined by triangulation of radio waves emitted by said wireless communication device.

27. The computer program product of claim 22 wherein the first user's current geographic position is determined by Received Signal Strength Indication of the transmitted signal from said wireless communications device by at least one receiving station remote from said communications device.

28. The computer program product of claim 22 wherein the first user's current geographic position is determined by said first user entering said position data via manual interface with said wireless communications device.

29. The computer program product of claim 22 wherein the wireless communication device automatically determines and then transmits the first user's current geographic position as part of said search request.

30. The computer program product of claim 22 wherein the search is performed a plurality of times in response to the user defining the periodicity and persistence of the search of said database.

31. The computer program product of claim 22 wherein the first user is automatically notified if an additional user becomes proximate to the first user wherein the additional user meets criterion established in the search of the database.

* * * * *

UNITED STATES PATENT AND TRADEMARK OFFICE
CERTIFICATE OF CORRECTION

PATENT NO. : 6,819,919 B1 Page 1 of 1
DATED : November 16, 2004
INVENTOR(S) : Hirohisa A. Tanaka It is certified that error appears in the above-identified patent and that said Letters Patent is hereby corrected as shown below:

Column 8,
Line 25, "use" should be -- user --

Signed and Sealed this

Fifteenth Day of February, 2005

JON W. DUDAS
*Director of the United States Patent and Trademark Office*